United States Patent [19]
Modiano

[11] 3,979,018
[45] Sept. 7, 1976

[54] APPARATUS FOR SEPARATING BUNDLED BARS

[76] Inventor: Guido Modiano, Via Gallignani, 9, Faenza (Ravenna), Italy

[22] Filed: June 3, 1975

[21] Appl. No.: 583,355

[30] Foreign Application Priority Data
June 5, 1974  Italy .................................... 3409/74

[52] U.S. Cl. ................................ 221/10; 221/225; 221/236; 221/242; 221/290
[51] Int. Cl.² ........................................ G07F 11/00
[58] Field of Search ................ 221/10, 13, 14, 225, 221/236, 237, 238, 242, 289, 290; 214/1 PB, 1 P, 8.5; 198/34

[56] References Cited
UNITED STATES PATENTS

| | | |
|---|---|---|
| 2,999,603 | 9/1961 | Smejda .............................. 214/1 PB |
| 3,045,846 | 7/1962 | Clark ............................ 214/1 PB X |
| 3,506,142 | 4/1970 | White ................................. 214/1 P |
| 3,774,779 | 11/1973 | White................................. 214/1 PB |

Primary Examiner—Allen N. Knowles
Attorney, Agent, or Firm—Guido Modiano; Albert Josif

[57] ABSTRACT

The invention relates to an apparatus for separating bundled bars, which comprises a magazine for containing the bars in bundles cooperating with means which reduce its width and thus cause the overflow of a certain number of bars from one of its longitudinal sides. The apparatus is also provided with a device for rolling the bars back and forth so to arrange them side by side through a passage where bars are intercepted and withheld by a hooking device which separates the bars singly and release it for transfer to a subsequent operation.

2 Claims, 7 Drawing Figures

APPARATUS FOR SEPARATING BUNDLED BARS

BACKGROUND OF THE INVENTION

The present invention relates to an apparatus for automatically separating bars from a bundle thereof and also for arranging the separated bars in such a manner that they are fed one at a time to machines such as automatic lathes, croppers, presses and the like.

It is generally known that such automatic machines are served by a feeder provided with a device for pushing bars; in the feeder input magazine, bars must be arranged in order, one behind the other, without being superimposed. The actual positioning of the bars in such magazines is a long, difficult and frequent operation: in fact, if the bars are relatively thin and therefore flexible it is difficult to arrange them in the aforementioned manner, while if the bars are thick, their weight is considerable; on the other hand, in order to limit the dimensions of the magazines and therefore to avoid burdening the feeder unit, the magazine must contain a small number of bars and therefore loading must be carried out frequently.

The object of the present invention is to make up for such deficiencies and difficulties by feeding the automatic machines which use the bars starting from a high capacity magazine in which the bars are arranged in bundles: the problem and the waste of time involved in ordering the bars do not exist and the user machine has an ample operating range.

A further object of the present invention is to provide an apparatus which is reliable and effective whatever the size of the bars.

SUMMARY OF THE INVENTION

These and other objects, which will better appear hereinafter, are all attained by the present apparatus for separating bundled bars, characterized in that it comprises a magazine for longitudinally containing a bundle of bars and cooperating with means for reducing the transversal width thereof in order to cause the overflowing of a few bars from a longitudinal side thereof; a device for the alternate transfer of the overflown bars, in a perpendicular direction thereto; an elastic pressing element, extending longitudinally parallel to the direction of displacement of the bars under the action of said device and facing this latter at its axis, which at its minimum distance from said device forms therewith a passage in which the bars may be held only side by side; a device for sensing the presence of bars on the transfer device, sensing device which controls said reduction means by way of activating them and causing the bars to overflow till depletion thereof on said device and by way, instead, of returning them to their rest position on arrival of the bars on the transfer device and which also controls a programmer for the alternating advance and return strokes of the transfer device by imparting to the programmer the starting signal at each overflow of the bars and that for returning to the initial conditions at each mentioned depletion; a device for intercepting the bars, arranged contiguous to said passage and close to its end, which on the arrival of the bar, controls the stopping of the advancement of the transfer device while preparing for the return stroke with the consequent backing of the bars; hooking means, placed in relation to said intercepting device and operating in combination therewith at least after a fixed number of said alternating strokes, for engaging the first bar sent by the transfer device and then withholding it during the subsequent return stroke of said same device, for the separation of this bar from the remaining ones on the transfer device, while alternately the same hooking means, during the new advance stroke of the transfer device, release the bar by its action so that subsequently it reaches a withdrawal station for entry into a bar pushing device.

BRIEF DESCRIPTION OF THE DRAWINGS

Further characteristics and advantages of the invention will be more apparent from the description of preferred but not exclusive embodiments of the apparatus according to the invention illustrated by way of example in the accompanying drawing, in which.

DESCRIPTION OF THE PREFERRED EMBODIMENT

Figure 1:
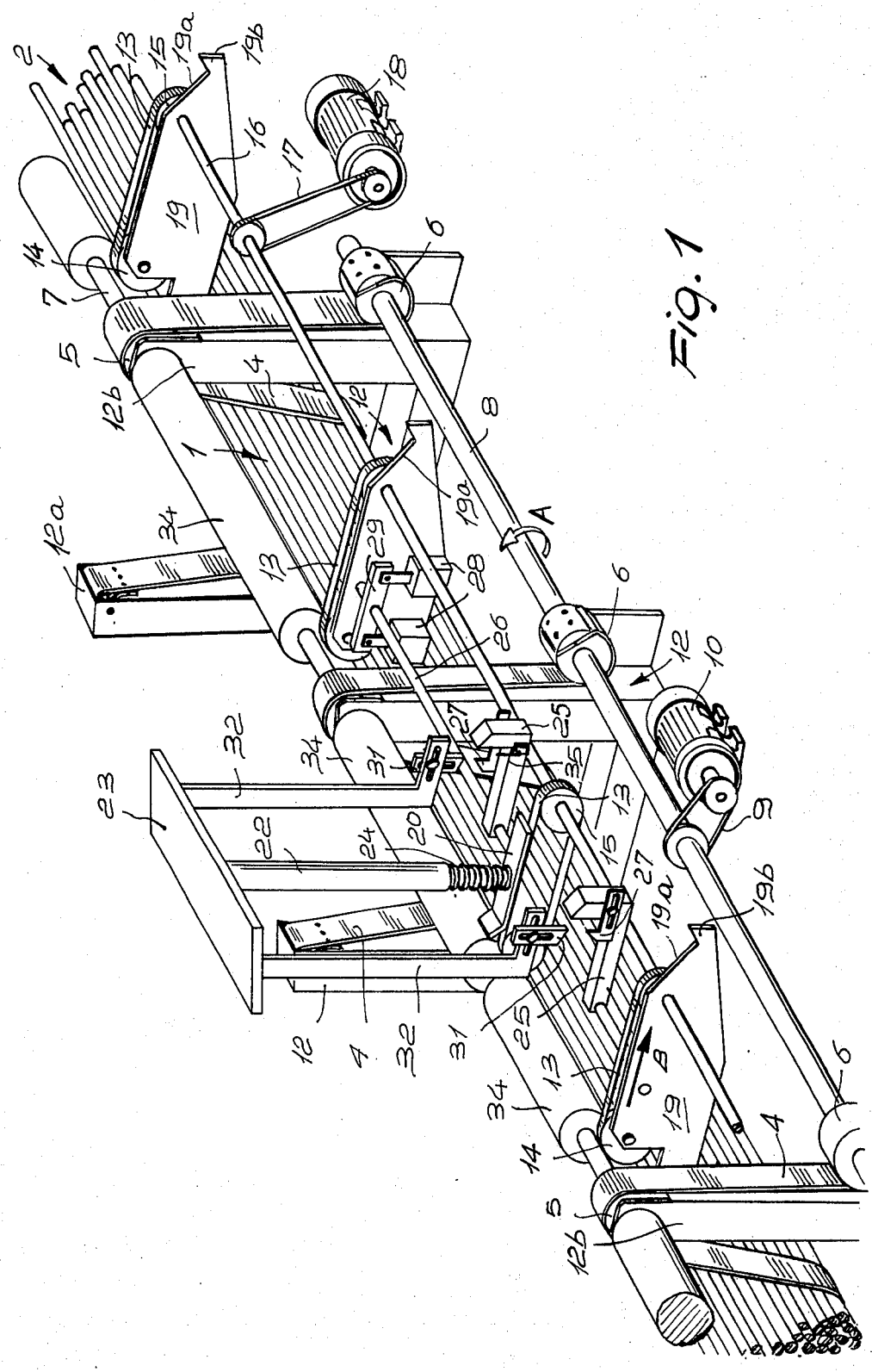
FIG. 1 is a partial perspective view of the apparatus according to the invention.

With particular reference to these figures, in which a part, device or element, represented more than once, are always distinguished by the same reference numeral, the reference numeral 1 indicates the magazine of the apparatus according to the invention, magazine which has the capacity for containing longitudinally a bundle 2 of bars 3 and which cooperates with means for reducing the transversal width thereof. The magazine forms, for example a pocket (FIG. 2b), in which the bars of the bundle are contained, consisting of a series of strong flexible strips 4. The strips 4 engage with relative rollers 5 and 6: the upper rollers 5 are idly mounted on a horizontal shaft 7, while the lower rollers 6 are keyed to a shaft 8 parallel to the preceding one and which by means of the drive 9 is caused to rotate, in both directions, by the reversible electric motor 10. One end of each strip 4 is connected to each roller 6, while the other end is suspended to a relative support 11 at the top of the highest arm 12a of a U-shaped element 12; the elements 12 form the framework of the apparatus, shafts 7 and 8 respectively being mounted rotatably at the top and at the foot of their lower arms 12b. Thus, when the shaft 8 is rotated in the direction A (FIGS. 1 and 2a) the lower end sections of the strips 4 are wound up on the rollers 6 and, by shortening the free length of the strips, the bottom of the pocket of the magazine 1 is raised and the width of its transversal section is reduced; in this manner, according to the number of bars 3 contained in the pocket 1, and for a certain degree of raising of the bottom thereof, some bars begin to overflow beyond the rollers 5 (FIG. 2a).

The bars which have overflown are received by the upper sides of a series of endless belts 13 wound around relative pulleys 14 and 15: the pulleys 14 are contiguous to the shaft 7, while the pulleys 15 are situated at a certain distance therefrom and are on the opposite side to the arms 12a. The pulleys 15 are keyed to the shaft 16, which is parallel to the preceding shafts and which by means of the drive 17 are caused to rotate, in both directions, by the reversible electric motor 18. Some pulleys 14 and the shaft 16 are rotatably mounted on vertical plates 19, which are contiguous to the belts 13 and to the arms 12b respectively, and rigidly attached to these latter. The bars drawn by the belts slide on the upper edge of the vertical plates and on passing the pulleys 15, as will be seen further on, are, one by one and with a frequency not greater than that with which they are withdrawn by the bar feeder combined to the apparatus, caused to fall down the chutes 19a, which are an extension of these upper edges; at the bottom of the chutes the bar is stopped by the presence of a hook 19b formed by each plate 19 and awaits to be transferred to the bar pushing device which serves the bars to an automatic user machine: the transfer of the bars to the bar pusher and the bar pusher itself may be of the type illustrated in Italian Patent No. 957,148.

Above the upper side of one of the belts 13, which in the apparatus is almost in a central position, there is arranged a pressure pad 20 which is elongated parallel to the belt, curling up however close to the shaft 7 so as to form a space for receiving bars between itself and the belt. The pressure pad 20 is rigid to the foot of a vertical shaft 21, which is upperly mounted slidingly in a sleeve 22 suspended from a plate 23, which is attached to the framework of said bar pushing device; the pressure pad is maintained lowered by a spring 24, fitted on the shaft 21 between the pressure pad itself and the sleeve 22. The downward displacement of the shaft is limited by an adjustable stop, not illustrated, in such a way that, at the lowest position of the pressure pad, there is formed between the pressure pad and the belt a gap whose height is sufficient to prevent the bars from passing therethrough one upon the other: thus, when the pressure pad is in its lowest position, the bars, even if thin, will be only side by side at least in this gap and in its vicinity. On each side of the pressure pad, there is (according to the embodiments of FIGS. 1 to 2d) a relative L-shaped element 25. The end of the flange 25a (FIG. 2a) of each L is rigid to a shaft 26 contiguous to the shaft 7 and parallel to it; the shaft is rotatably mounted on two plates 19 and normally has an angular position such that other almost vertical flanges 25b of the two L's end above the upper sections of the belts 13 just before the extremity of the pressure pad 20, facing the pulleys 15. In this position, the top of the flanges 25b intercept therefore the vicinities of said gap between the pressure pad and the belt and form an abutment and stop for the oncoming bars, drawn in the direction B by the belts. The shaft 26 is then controlled to assume two other angular positions: an inoperative position (FIG. 2d), in which the flanges 25b are below the level of the upper sections of the belts 13, and an active position (FIG. 2c) in which not only the flanges 25b, but also the hooks 27, applied thereto, are above said level. The control signals by which the shaft 26 assumes the active or inoperative position are for example given by one and respectively the other of the electromagnets 28, which are fixed to a plate 19 and which have their anchors articulated respectively to the ends of a cross piece 29 of the same shaft. Each hook 27 has its active portion behind the abutment of the relative flange 25b and its distance with respect to it is adjustable so that between the aforementioned abutment and active portion there is formed a seat for receiving only one bar 3: the stem of the hook 27 is in fact provided with an elongated slot parallel to the flange 25a and engaged by the fastening screw 30. Above each hook 27 there is a counteracting element 31, which is fixed to the foot of a relative element 32 suspended from the plate 23: the counteracting element is adjustable with respect to the element 32 both vertically and parallely to the belts 13.

Figure 2A:
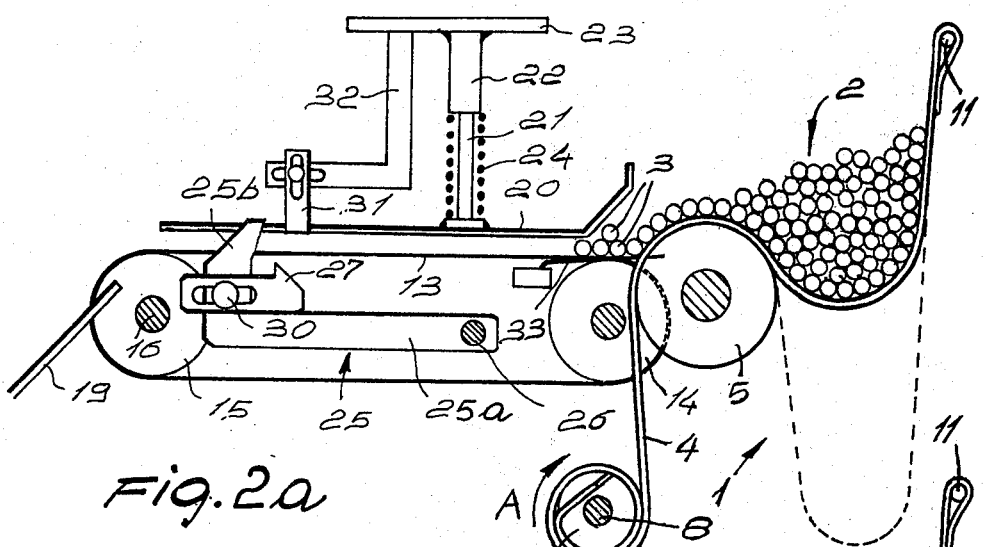
FIGS. 2a, 2b, 2c and FIG. 2d are vertical cross-sections of the apparatus, representing subsequent phases of an operating cycle thereof.
Figure 2B:
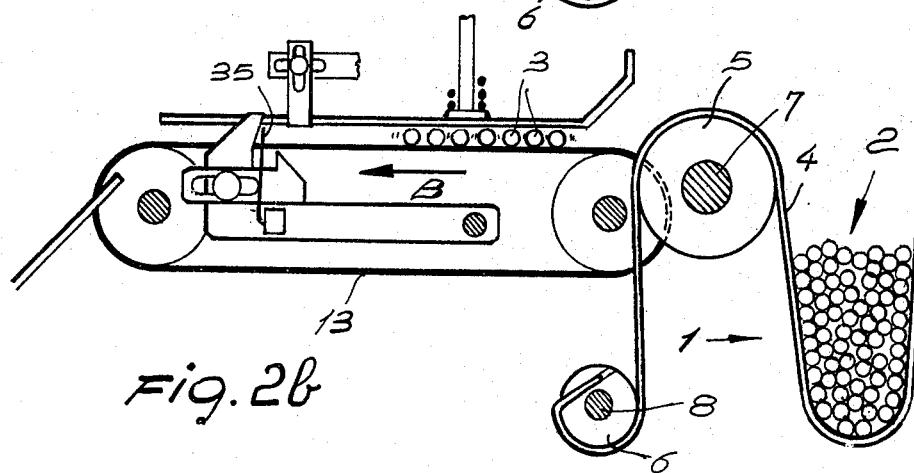
Figure 2C:
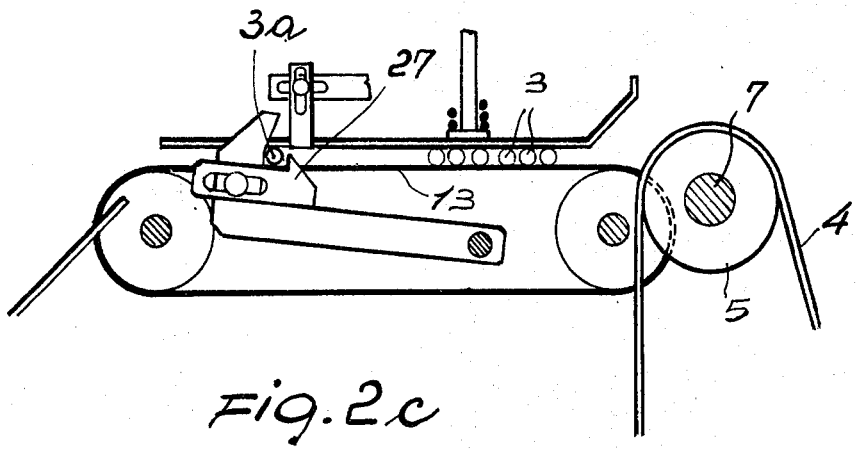
Figure 2D:
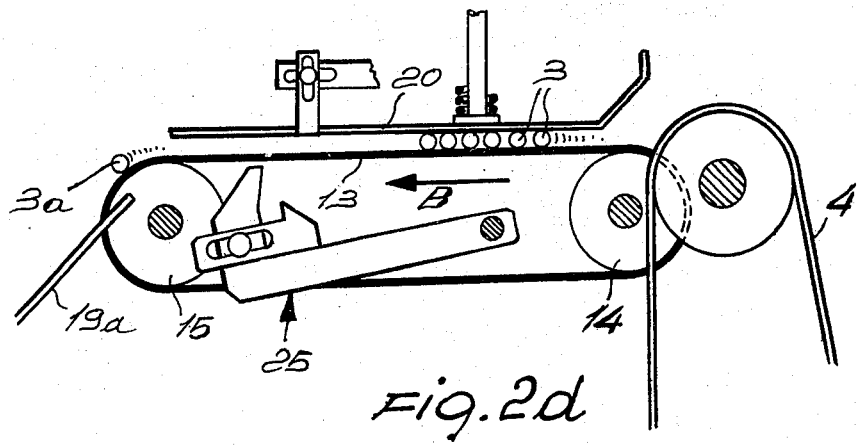

The operation of the invention is the following: by rotating the shaft 8 in the direction A, a certain number of bars 3 are caused to overflow from the magazine 1 and to fall on the belts 13, their presence on the belts being detected by the sensing device 33 (FIG. 2a). The sensing device, affected by the overflown bars, activates a timer switch which controls the electric motor 10 so that the shaft 8 rotates in a direction opposite A: the bundle 2 of bars, contained in the pocket of the magazine 1, thus descends so as to prevent any further overflowing. At this point some bars will be in equilibrium on the rollers 34, which are keyed to the shaft 7 on which the rollers 5 are idle and which have a diameter slightly greater than that of the same rollers 5; the shaft 7 is connected by means of a drive to a reversible electric motor. It is now desired to have the overflown bars arrange themselves surely side by side at least in the vicinity of the pressure pad 20 (FIG. 2b): the sensing device 33 thus starts the programmer which, for predetermined times, controls the electric motor 18 alternately in one direction or in the other; the advancing strokes in the direction B of the upper sections of the belts 13 come to a stop however each time that the bar 3 ahead of the others, rests against the flanges 25b, which are in normal position, and thus actuates the sensing devices 35 applied to the elements 25. The belts 13 initially execute a stroke in the direction B and then a stroke in the opposite direction and so on for a few times, so that at the end of this rolling operation of the bars between the pressure pad 20 and the upper section of the underlying belt 13, the overflown bars are surely arranged side by side. During each advance in the direction B, following the rolling operation, when the first bar comes to rest against the flanges 25b, the sensing devices 35, through said programmer, send an excitation signal to one of the electromagnets 28 so that the elements 25 and the hooks 27 are raised into the active position thus hooking only that bar. In relation to such raising (FIG. 2c) there follows a return of the belts 13 in the opposite direction to B and therefore a positive and net separation is obtained between the various overflown bars and the bar 3a withheld between the elements 25 and the hooks 27. When the belts 13 start to advance once again, the elements 25 have already returned to their inoperative position (FIG. 2d) and the bar 3a abandoned on the belts is transferred and made to fall down the chutes 19a; by returning the elements 25 to their normal position, the other bars drawn by the belts abut against the flanges 25b and therefore the first bar is again hooked as previously described. The various phases are repeated until there are no more bars on the belts 13; the sensing device 33 thus detects the absence of bars and, while it sends a signal to said programmer for returning it to its initial conditions, it controls the electric motor 10 in such a manner as to cause the shaft 8 to rotate in the direction A with a resulting new overflowing of bars from the magazine.

Figure 3:
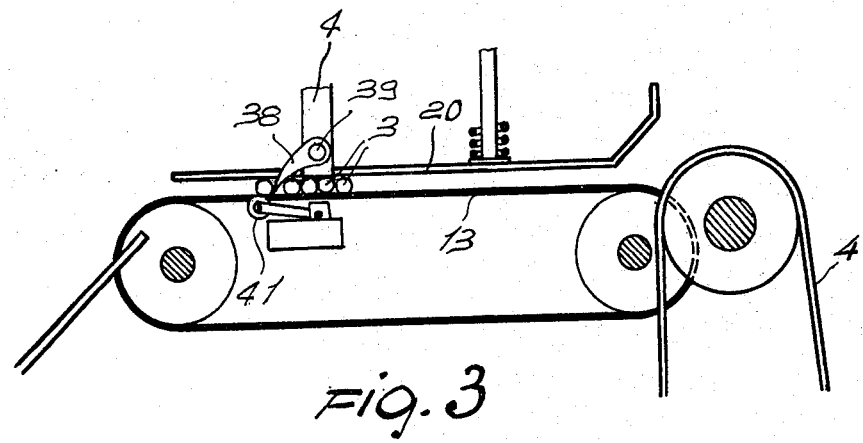
FIGS. 3 and 4 represent, with sections similar to the preceding ones, two further embodiments of the apparatus.
Figure 4:
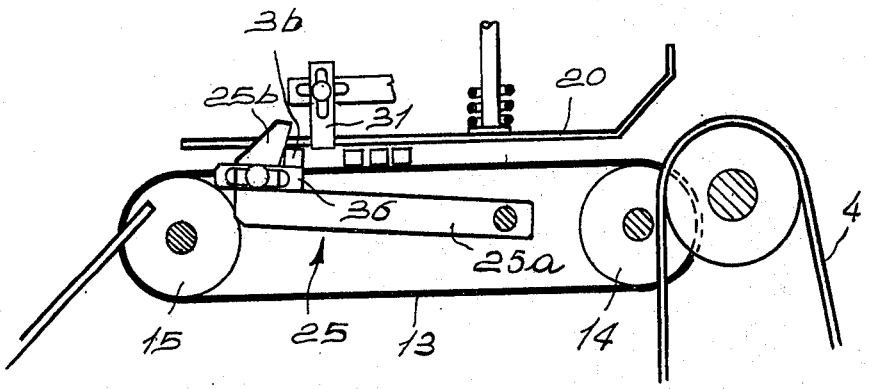

The embodiment of the apparatus, described heretofore, refers to bars with a circular section; when in fact the overflown bars have come to rest side by side against the flanges 25b, the two hooks 27, in being raised in their active position, due to their particular shape, insert themselves between the first and the second bar thus easily distinguishing one from the other. In the case that the bars have a quadrangular section (FIG. 4), in place of a hook 27, there is applied to each of the elements 25 a relative block 36 which extends parallel to and above the flange 25a: the block is adjustable with respect to the element 25 parallely to the flange 25a: behind the flange 25b, the block 36 thus forms with the flange a square seat for receiving one quadrangular bar 3b and for keeping it pressed against the pressure pad 20 when the elements 25 are raised to their active position. In the case of thick round bars, in place of the pair of elements 25, hooks 27 and counteracting elements 21, there may also be provided (FIG. 3) a pair of pawls 38, arranged on each side of the pressure pad 20. Each pawl is articulated in the point 39 to an element 40 which, similarly to the element 32, is suspended from the plate 23 and which is loaded downwards, for example by a spring, so that its tip is normally at the height of the upper sections of the belts 13. In this latter case, the rolling operation of the bars is not necessary and, when the first bar 3, drawn in the direction B by the belts 13, pushes against the pawls 38, these are raised to let it pass, and fall down behind it immediately afterwards; when the bar has passed the pawls, it is detected by the sensing device 41, which, through the programmer, controls the electric motor 18 similarly to the sensing devices 35 and caused reversal of the motion of the belts 13. The single bar which has passed the pawls cannot therefore return back due to the presence of these while other bars are clearly separated therefrom.

The invention thus conceived attains the proposed objects. It is susceptible to numerous modifications and variants all falling within the scope of the inventive concept; furthermore all the details may be substituted by other technically equivalent ones. In practice, the materials employed as well as the shape and the dimensions may be any according to requirements.

I claim:

1. Apparatus for separating bundled bars, characterized in that it comprises a magazine for longitudinally containing a bundle of bars and cooperating with means for reducing the transversal width thereof in order to cause the overflowing of a few bars from a longitudinal side thereof; a device for the alternate transfer of the overflown bars, in a perpendicular direction thereto; an elastic pressing element, extending longitudinally parallel to the direction of displacement of the bars under the action of said device and facing this latter at its axis, which at its minimum distance from said device forms therewith a passage in which the bars may be held only side by side; a device for sensing the presence of bars on the transfer device, a sensing device which controls said reduction means by way of activating it and causing the bars to overflow till depletion thereof on said device, instead, of returning them to their rest position on arrival of the bars on the transfer device and which also controls a programmer for the alternating advance and return strokes of the transfer device by imparting to the programmer the starting signal at each overflow of the bars and that for returning to the initial conditions at each mentioned depletion; a device for intercepting the bars, arranged contiguous to said passage and close to its end, which on the arrival of the bar, controls the stopping of the advancement of the transfer device while preparing for the return stroke with the consequent backing of the bars; hooking means, placed in relation to said intercepting device and operating in combination therewith at least after a fixed number of said alternating strokes, for engaging the first bar sent by the transfer device and then withholding it during the subsequent return stroke of said same device, from the separation of this bar from the remaining ones on the transfer device, while alternately the same hooking means, during the new advance stroke of the transfer device, release the bar by its action so that subsequently it reaches a withdrawal station for entry into a bar pushing device.

2. Apparatus as claimed in claim 1, wherein said longitudinal overflow side of said magazine consists of rollers operated to carry out a series of partial alternate rotations about their axis when said reduction means have been returned to their rest position through said device for sensing the presence of bars on said transfer device, so as to cause the bars, which are in equilibrium on said rollers, to fall in said magazine or on said transfer device.

* * * * *

UNITED STATES PATENT OFFICE
CERTIFICATE OF CORRECTION

Patent No. 3,979,018    Dated September 7, 1977

Inventor(s) Vladimiro Fabbri

It is certified that error appears in the above-identified patent and that said Letters Patent are hereby corrected as shown below:

On the title page change the inventor's name to read as follows:

[76] Inventor: VLADIMIRO FABBRI, Via Gallignani, 9,

Signed and Sealed this

Twenty-ninth Day of March 1977

[SEAL]

Attest:

RUTH C. MASON  
Attesting Officer

C. MARSHALL DANN  
Commissioner of Patents and Trademarks